United States Patent
Di Lorenzo et al.

(10) Patent No.: US 10,119,826 B2
(45) Date of Patent: Nov. 6, 2018

(54) SYSTEM AND METHOD FOR ACCELERATING ROUTE SEARCH

(71) Applicant: FLEETMATICS DEVELOPMENT LIMITED, Dublin (IE)

(72) Inventors: David Di Lorenzo, Florence (IT); Tommaso Bianconcini, Florence (IT); Alessandro Lori, Florence (IT); Peter Mitchell, Ranelagh (IE); Fabio Schoen, Florence (IT)

(73) Assignee: Verizon Connect Ireland Limited, Dublin (IE)

( * ) Notice: Subject to any disclaimer, the term of this patent is extended or adjusted under 35 U.S.C. 154(b) by 0 days.

(21) Appl. No.: 15/525,228

(22) PCT Filed: May 19, 2015

(86) PCT No.: PCT/EP2015/060961
§ 371 (c)(1),
(2) Date: May 8, 2017

(87) PCT Pub. No.: WO2016/184501
PCT Pub. Date: Nov. 24, 2016

(65) Prior Publication Data
US 2017/0336219 A1 Nov. 23, 2017

(51) Int. Cl.
*G01C 21/34* (2006.01)
*G06Q 10/04* (2012.01)

(52) U.S. Cl.
CPC ..... *G01C 21/3446* (2013.01); *G01C 21/3453* (2013.01); *G06Q 10/047* (2013.01)

(58) Field of Classification Search
CPC ............ G01C 21/3446; G01C 21/3453; G06Q 10/047
See application file for complete search history.

(56) References Cited

U.S. PATENT DOCUMENTS 5,978,730 A * 11/1999 Poppen .............. G01C 21/3446
370/351
6,016,485 A * 1/2000 Amakawa .......... G01C 21/3446
701/533
(Continued)

FOREIGN PATENT DOCUMENTS

EP 2 169 502 A1 3/2010

OTHER PUBLICATIONS

Carleton University, "Dijkstra's Algorithm for Shortest Route Problems", http://optlab-server.sce.carleton.ca/POAnimations2007/DijkstrasAlgo.html, 2007, 1 page.
(Continued)

*Primary Examiner* — Courtney D Heinle

(57) ABSTRACT

A method for finding an approximation to the all-pairs shortest travel path between a number of predetermined nodes, comprising clustering nodes of an original road network into a plurality of subgroups so that the number of nodes in each subgroup is no greater than a first predetermined threshold and the maximum distance between any two nodes of a subgroup is no greater than a second predetermined threshold; adding information of intra group shortest paths for all pairs in a same subgroup to a newly created higher level road network; adding information of inter group shortest paths for the plurality of subgroups to the same road network; and searching the same road network for the shortest travel path. In those cases in which the path returned is not exact, the path represents one in the original map, even if not necessarily the best one.

20 Claims, 9 Drawing Sheets

(56) References Cited

U.S. PATENT DOCUMENTS

| | | | | |
|---|---|---|---|---|
| 6,038,509 | A * | 3/2000 | Poppen | G01C 21/3415 701/26 |
| 8,566,030 | B1 * | 10/2013 | Demiryurek | G01C 21/3492 701/409 |
| 2010/0262359 | A1 * | 10/2010 | Motoyama | G01C 21/32 701/532 |
| 2011/0113155 | A1 * | 5/2011 | Kuznetsov | G01C 21/3446 709/241 |
| 2012/0046819 | A1 * | 2/2012 | Agrawal | G06Q 10/047 701/25 |
| 2013/0204528 | A1 * | 8/2013 | Okude | G08G 1/096822 701/533 |
| 2014/0129139 | A1 * | 5/2014 | Ellison | G01C 21/3469 701/533 |

OTHER PUBLICATIONS

Sanders et al., "Engineering Fast Route Planning Algorithms", 2007, pp. 23-36.

International Search Report and Written Opinion of the International Searching Authority corresponding to PCT/EP2015/060961, dated Jul. 22, 2015, 9 pages.

* cited by examiner

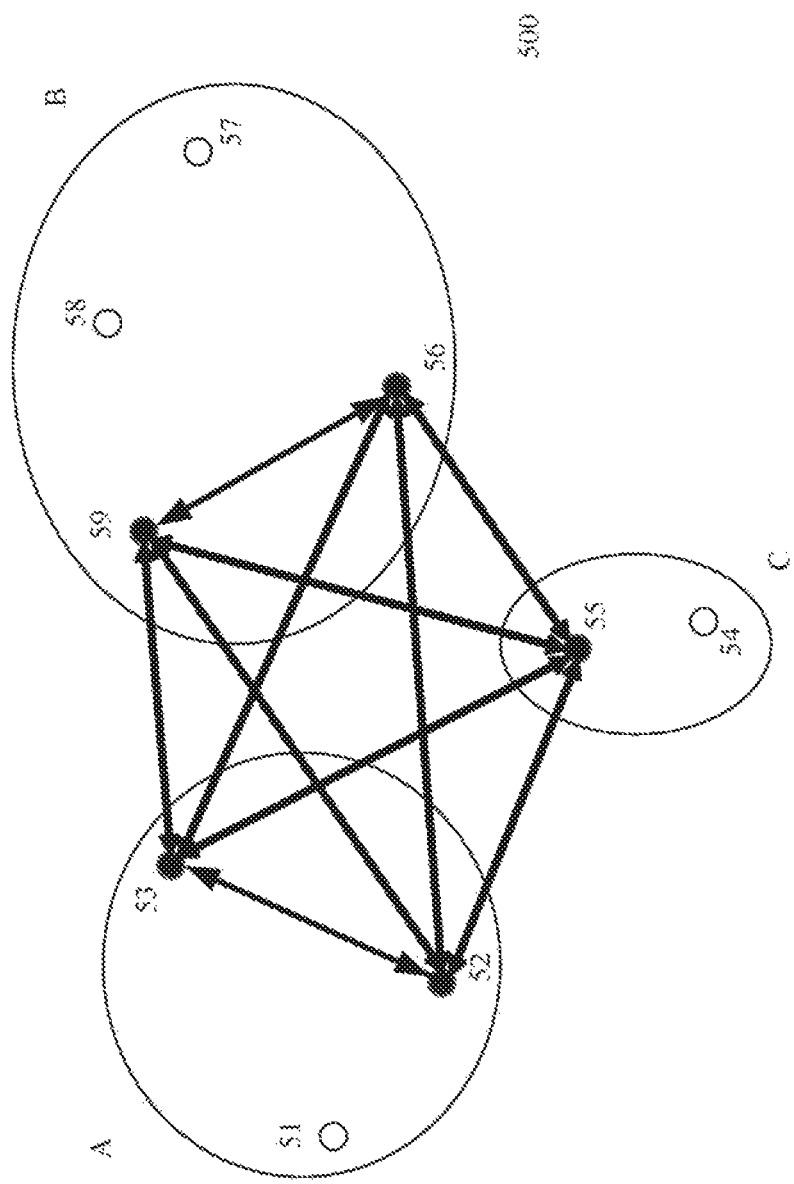

SYSTEM AND METHOD FOR ACCELERATING ROUTE SEARCH

RELATED APPLICATION

This application claims priority to PCT Application No. PCT/EP2015/060961, filed May 19, 2015, which is incorporated herein by reference.

FIELD OF THE INVENTION

The present application generally relates to a system and method for accelerating the search of the shortest path between any two nodes of a given set. Specifically, the system and method can search the shortest travel route for a vehicle between any starting location and destination location of an initial set of coordinates.

BACKGROUND

When a fleet of vehicles is used to deliver goods or provide services, finding for every vehicle the optimal route has many practical benefits, including the reductions of in-transit time, fuel consumption, and vehicle emission. In order to determine such optimal routes, a routing algorithm has first to compute, for every pair of customers to serve, the time required to travel from one to another. For any practical application, a high number of shortest-path problems must then be solved. A successful solution to a shortest path problem relies on at least two basic foundations: one is the data used to represent the geographical information and the other one is the search algorithm.

The geographical information, such as an electronic map of a road network, is typically operated by a data provider either free of charge or with charge. Such geographical information uses nodes and weights to represent points of interest along a road network and distances. The points of interest can be landmarks, intersections, business location, and etc. Generally speaking, the number of nodes included in such database depends on the size of the area that the database covers. For a small town, the number of nodes may be a few hundreds. For a region, the number of nodes may be a few millions. For a continent, the number of nodes may be a few hundred millions.

After the geographical information is available. Dijkstra's algorithm is a classical algorithm for finding the shortest paths from an electronic map. The following webpage provides an example illustrating how this algorithm works in a practical manner: http://optlab-server.sce.carleton.ca/PO-Animations2007/DijkstraAlgo.html. In general, the Dijkstra's algorithm separates the nodes on a network, sometimes called graph, into two groups: a "solved" group and an "unsolved" group. The algorithm implements an iteration process, during which each iteration moves one node in the network from the unsolved group to the solved group. At the beginning, the solved group only has the starting node. The unsolved group has the remaining nodes. Then, the Dijkstra's algorithm starts from the starting node and visits all nodes in the unsolved group that are adjacent to the nodes in the solved group to search for the shortest distance from the starting node. After the first iteration, the algorithm identifies this extra node as a "solved" node and adds it to the solved group. The second iteration will visit the rest of unsolved nodes that are adjacent to the nodes in the "solved" group and identify one extra node as another "solved" one. Such iteration continues until the destination node is included in the "solved" group.

Although Dijkstra's algorithm can find an exact solution for the shortest path problem, it has certain drawbacks for practical applications. For large graphs such as those representing regional or continental maps, Dijkstra's process can be computationally intensive because such algorithm has to be called repeatedly, on a large map graph, for every customer to be served. In the transportation application, the time taken to solve the shortest-path problem is an important factor in evaluating the performance of a routing system. A manager using automated software to compute many driver routes based on preset schedules would expect a search result from the server in a few minutes. A routing algorithm based on Dijkstra's algorithm without modification would not be able to satisfy such need.

Various methods have been used to accelerate the Dijkstra's algorithm. The article titled "Engineering Fast Route Planning Algorithm," Peter Sanders et al., WEA 2007, LNCS 4525, pp. 23-35, 2007 provides a general introduction on different methods to accelerate the Dijkstra's algorithm. A drawback of commonly used accelerating methods is that they rely on additional information of a graph to prioritize the search algorithm. For example, in a vehicle routing application, some accelerating algorithms use speed profile, highway hierarchies, and traffic volume to speed up the search process. But, this type of accelerating techniques puts higher demands on comparing resources because the additional data needs to be buffered and processed during the runtime of the search algorithm. Furthermore, using Dijkstra of Dijkstra-based algorithms requires the raw map data to be available. This data is however often unavailable, due to commercial and technological reasons. An external service is used instead to compute the distances by executing suitable queries. Such external service will itself hold the raw map data, but will not make it available to the routing service.

SUMMARY OF THE INVENTION

Thus, it is desired to have a system and method that reduces the amount of time used for searching a shortest route. It is preferred that such a system and method would require less amount of data from a geographical information database in order to save computational resources and increase computing efficiency.

The present application discloses a system and method that approximates all pairs distance matrices by decomposing the node set and relying on exact distance (shortest path) computation only to a limited set of nodes. The result is based on a hierarchical decomposition of nodes by which clusters of close by nodes are first identified. Within each cluster exact distances are computed with any of the currently available algorithms. Some inter cluster routes are also computed exactly, while most of the others are approximated. A balance is reached between precision of the computed matrix and computational effort to obtain it.

Many conventional technologies aim at finding the exact all pairs distance matrix based on the knowledge of the underlying graph. If direct access to the additional underlying attributes of a network is not provided, it makes the conventional methods impossible to exploit typical shortcuts in path computations, like, e.g., those on which many speed-up techniques for Dijkstra-like methods are based. The present application is capable of dealing with situations in which the user has no direct access to the underlying attributes of a graph but can just query a path server to obtain the distance between two nodes or the all-pairs distance matrix of a set of nodes. This method enables to speed up and to save queries to an all-pairs shortest path server by using a set of small dimensional queries for shortest paths instead of a single large one. The method also enables running the small dimensional queries in parallel, thus substantially cutting the total time required to complete all the queries. The present application is capable of obtaining a balance between speed and precision so that routes which are most likely to be used in a practical routing situation are computed exactly with high probability, while approximations are obtained for pairs with large distances.

An embodiment of the present application is directed to a method for approximating the all-pairs shortest travel path between a set of nodes of an original road network. The method comprises clustering the set of nodes into a plurality of subgroups so that the number of nodes in each subgroup is no greater than a first predetermined threshold and the maximum distance between any two nodes of a same subgroup is no greater than a second predetermined threshold; adding information of intra group shortest paths for all pairs that belong to a same subgroup; adding information of inter group shortest paths for all pairs of subgroups; and searching the original road network and the added information for the shortest travel path.

According to an embodiment, the maximum distance represents an Euclidean distance.

According to another embodiment, the clustering step uses coordinates of nodes to calculate the Euclidean distance and does not use information of highway hierarchy or speed profile for clustering the set of nodes.

According to yet another embodiment, the intra group shortest paths represent the shortest paths for all pairs in the same subgroup.

According to yet another embodiment, the method further identifies border nodes based on a closest Euclidean distance between two subgroups.

According so yet another embodiment, the inter group shortest paths represents the shortest paths of ail pairs of the border nodes.

According to yet another embodiment, the intra group shortest paths for all pairs in the same subgroup and the inter group shortest paths for all pairs of the subgroups are calculated by a 3rd party computing server.

According to yet another embodiment, the method further creates a reduced graph that includes a predetermined number of nodes selected from the set of nodes.

According to yet another embodiment, a Dijkstra algorithm is used on the reduced graph to find a path between any two nodes of the reduced graph.

According to yet another embodiment, the clustering step is implemented periodically or is triggered by a set of predetermined events.

According to another aspect, the present application is directed to a non-transitory recording medium storing an executable program that, when executed, causes a processor to implement a method for approximating the all-pairs shortest travel path between a set of nodes of an original road network as set forth in the present disclosure.

BRIEF DESCRIPTION OF THE DRAWINGS

The accompanying drawings are provided to illustrate embodiments of this disclosure, and, together with the detailed description, serve to explain principles of embodiments as set forth in the present application, in which;

FIG. 5C illustrates shortest paths among nodes in the border node group according to an embodiment of the present application.

DETAILED DESCRIPTION

It will be appreciated by those ordinarily skilled in the art that the foregoing brief description and the following detailed description are exemplary (i.e., illustrative) and explanatory of the subject matter as set forth in the present application, but are not intended to be restrictive thereof or limiting of the advantages that can be achieved by the present application in various implementations. Additionally, it is understood that the foregoing summary and ensuing detailed description are representative of some embodiments as set forth in the present application, and are neither representative nor inclusive of all subject matter and embodiments within the scope as set forth in the present application.

Figure 1:
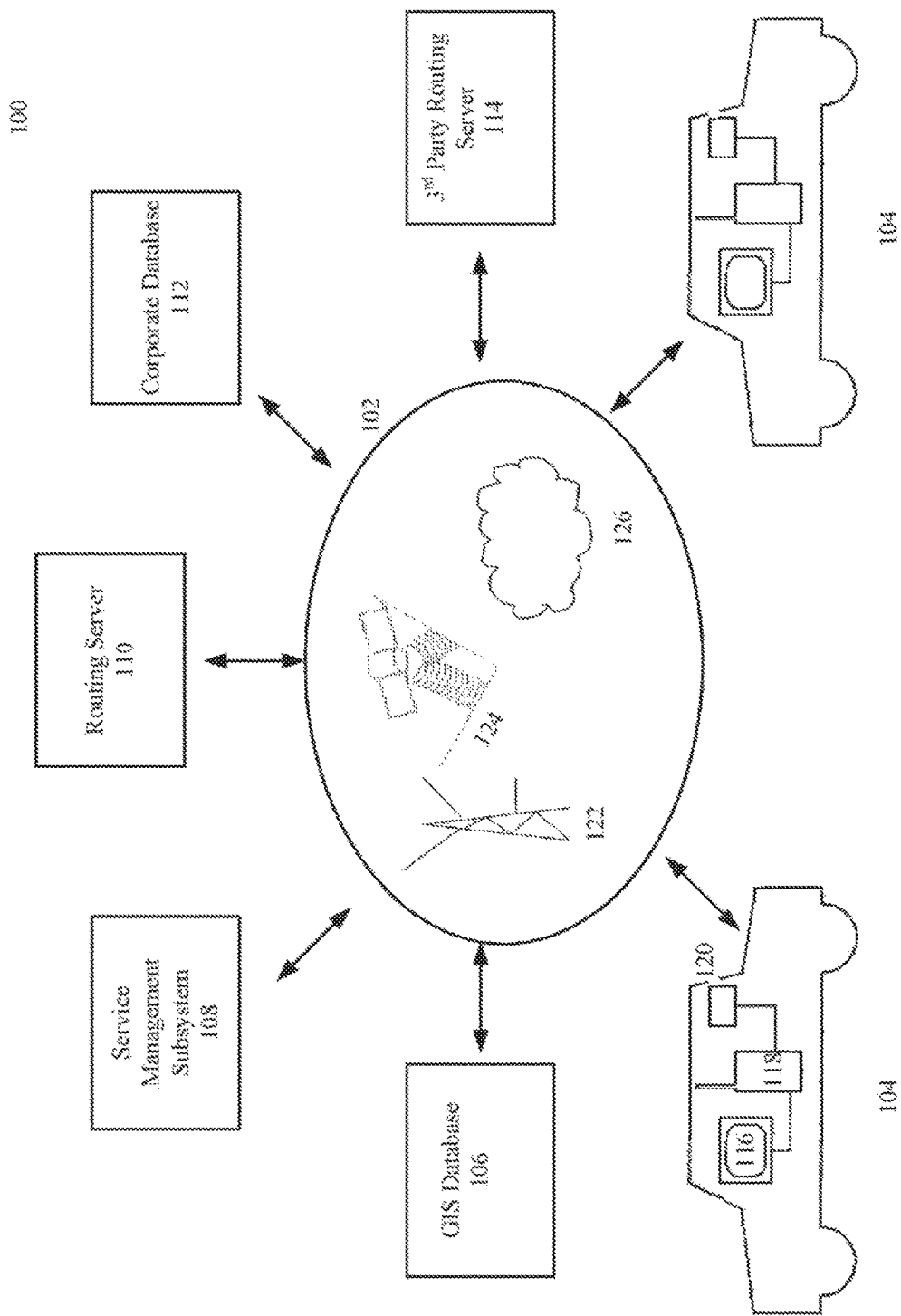
FIG. 1 illustrates a routing system according to an embodiment of the present application.

FIG. 1 illustrates a routing system according to an embodiment of the present application. The routing system 100 provides routing services to a plurality of vehicles 104. The routing system 100 may be owned by one company that provides routing service for a plurality of entities who subscribe for the routing service. For example, the routing server 110 may be one of a plurality of routing servers operated and managed by a company that provides fleet-related services to other companies. In another example, a plumbing company, which has a vehicle fleet 104 on call for jobs in several towns, may desire to use a $3^{rd}$ party provided routing service to improve the schedule and management of their vehicles. The same service may be also desired by a local car service company. Both the plumbing company and the car company would not want to have their own routing system due to cost and lack of expertise. According to an embodiment, the routing system 100 is used to generate suitable routes through a number of points. According to an embodiment, a suitable route represents a set of shortest paths or the least cost path between a number of points. The term "shortest path" or "least cost path" is not limited to the shortest distance, but also includes the concepts of minimum time, the least amount of fuel consumption, the least amount of emission, or the combination thereof. According to an embodiment, the routing system 100 is used to generate suitable routes for a plurality of clients, which manage a fleet of vehicles. The client may submit a plurality of routing requests based on their fleet schedules.

As shown in FIG. 1, the routing system 100 includes a communication network 102, a GIS database 106, a service management subsystem 108, a routing server 110, a corporate database 112, and a $3^{rd}$ party computing server 114.

When a vehicle 104 needs a routing service, the vehicle 104 sends a request to the service management subsystem 108 via the communication network 102. The service management subsystem 108 manages the communication between the vehicle 104 and other components of the system 100. After the request information is transmitted from the service management subsystem 108 to the routing server 110, a desired route is identified by the routing server 110 and transmitted back to the vehicle 104. The routing server 110 may also use information stored in a corporate database 112 and may also use $3^{rd}$ party computing server 114 to accelerate the process of searching for a desired route. According to an embodiment, the routing system 100 may provide routing services to a vehicle. According to an embodiment, the routing system 100 may provide routing services to a fleet manager, who submits route search requests in batches based on planned deliveries or client locations.

The communication network 102 should be broadly construed to include any one or more of a number of types of networks that may be created between devices using an internet connection, a LAN/WAN connection, a telephone connection, a wireless connection, a short message system (SMS), a satellite connection, and so forth. According to an embodiment, the communication network 102 includes at least a cellular network 122, a satellite network 124, and a computer network 126, such as the Internet. The computer network 126 may comprise various configurations and protocols including the internet, World Wide Web, intranets, virtual private networks, wide area networks, local networks, private networks using communication protocols proprietary to one or more companies, Ethernet, WiFi and HTTP, cloud and cloud based services, and various combinations of the foregoing. Such communication may be facilitated by any device capable of transmitting data to and from other computers, such as modems (e.g., dial-up, cable or fiber optic) and wireless interfaces.

The plurality of vehicles 104 may belong to the same entity or may belong to different entities. The plurality of vehicles 104 may be any mobile vehicle such as a passenger car, a bus, a train, or a truck. According to an embodiment, the vehicle 104 includes a user interface unit 116 for communicating with a user, a wireless communication unit 118 for transmitting and receiving information with external devices, and a satellite transceiver unit 120 for communicating with navigation satellites 124 to receive and transmit GPS data. The user interface unit 116 is capable of displaying a map and routes on an electronic screen and also using voice to assist navigation. The wireless communication unit 118 is capable of transmitting to and receiving data from the cellular communication network 122. According to an embodiment, the wireless communication unit 118 is also capable of implementing a short range wireless communication protocol such as Bluetooth. According to an embodiment, a driver is allowed to input a starting point and an ending point for travelling by a plurality of methods. The driver can use the address and coordinates to specify a location. The driver may also use a touch screen to input locations by tapping on the screen. The driver may also use a schedule to input the desired travel points. The satellite unit 120 may automatically determine a current location and make the current location information available to the driver.

The GIS database 106 provides comprehensive sets of base and thematic spatial data, including map data, in electronic format. In general, the electronic maps depict known road networks and identify points of interest at geographical locations along the road networks. The point of interests, such as route intersections, landmarks, and identified waypoints, are generally called nodes and are identified in the computer by coordinate locations of a selected geographical coordinate system. In addition, the GIS database 106 is capable of integrating data from other databases such as a traffic information database which can provide operational information of road networks, including speed profile, emergency repair, highway hierarchy, and closure information. The GIS database 106 may provide the data to a user free of charge or with charge. When the GIS database 106 charges a fee for the service, a user who uses the service would have a preference to use less data and service to reduce the expense. According to an embodiment of the present application, the routing server 110 may not need full sets of the information recorded in the GIS database 116. According to an embodiment, when the routing server 110 clusters a set of points, the routing server 110 may needs only the coordinates of those points and does not require the link information among those points.

The service management subsystem 108 represents an interface between the vehicle 104 and the other components of the system. The service management system 108 receives requests from the vehicle 104 and transmits those requests to designated subsystems. The service management system 108 is also capable of sending information, such as route information or traffic alerts, to the vehicle 104.

The routing server 110 implements a plurality of search algorithms to find suitable routes, such as the shortest path, for all the vehicles. The routing server 110 will run the routing algorithms on its own processing unit. The routing server 110 may divide the searching tasks and request $3^{rd}$ party computing server 114 to compute the travel distances and times in parallel, which sometimes is called a decentralized search. An objective of the present application is to reduce the response time of the routing server 110 in response to a route search request.

The corporate database 112 stores histories of routing requests and search results. For example, the corporate database 112 may maintain a log of routing history for each vehicle. The corporate database 112 may maintain a log of routing history for each driver. The corporate database 112 may also maintain a log of routing history for each entity that subscribes to the routing system. When the routing system 110 needs to select a route from multiple candidates, the routing history stored in the corporate database may be provided to the routing system 110 to select a route according to the preference of an entity or a driver based on their routing history.

Figure 2:
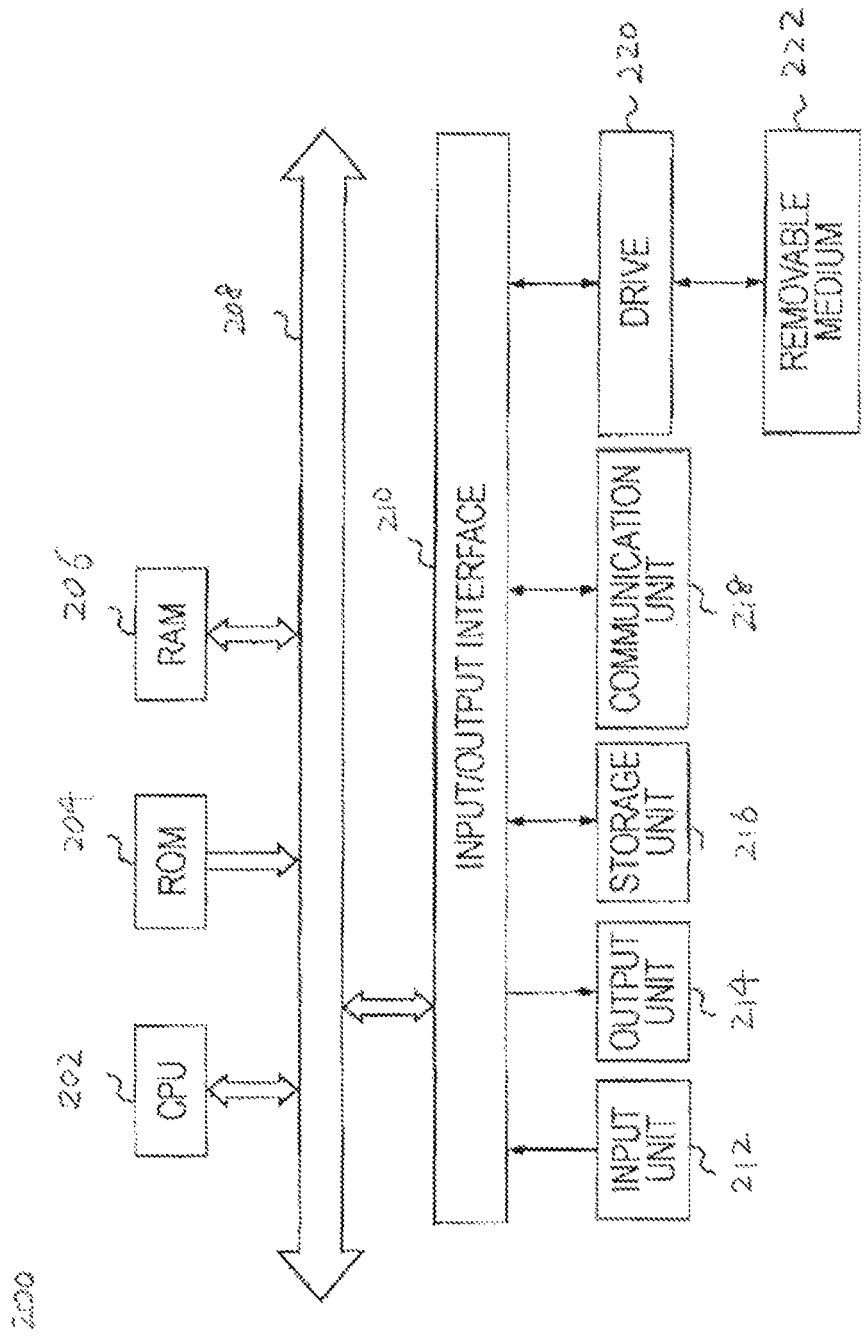
FIG. 2 illustrates a general structure of a computing device according to an embodiment of the present application.

FIG. 2 illustrates a general structure of the service management subsystem 108, the routing server 110, and the $3^{rd}$ party computing server 114 according to an embodiment. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A non-transitory stooge medium 222, sometimes removable, may be formed of a magnetic disk, an optical disc, a magneto-optical disc, flash or EEPROM, SDSC (standard-capacity) card (SD card), or a semiconductor memory. The medium 222 is loaded as appropriate into the drive 220. The drive 220 reads data recorded on the medium 222 or records predetermined data on the removable medium 222.

An operating system such as Microsoft Windows 7®, Windows XP® or Vista™, Linux®, Mac OS®, or Unix® may be used by the device 200. Other programs, may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET® Perl, Ruby, Python, or other programming languages, possibly using object oriented design and/or coding techniques.

Data may be retrieved, stored, or modified, in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

According to an embodiment of the present application, the routing algorithm and process as disclosed in the present application may be implemented as hardware, software, or both. When the algorithm and process are implemented as software, such as an executable program, the algorithm and process are stored in the medium 222. The general structure as shown in FIG. 2 needs to be specifically configured to process the algorithm and process as disclosed in the present application. For example, the programs need to be installed in the device 200 and registered in the operation system. Thus, those individual instructions included in the programs transfer the exemplary structure from a general computer to a special designed device to execute the algorithm and process as disclosed in the present application.

Figure 3:
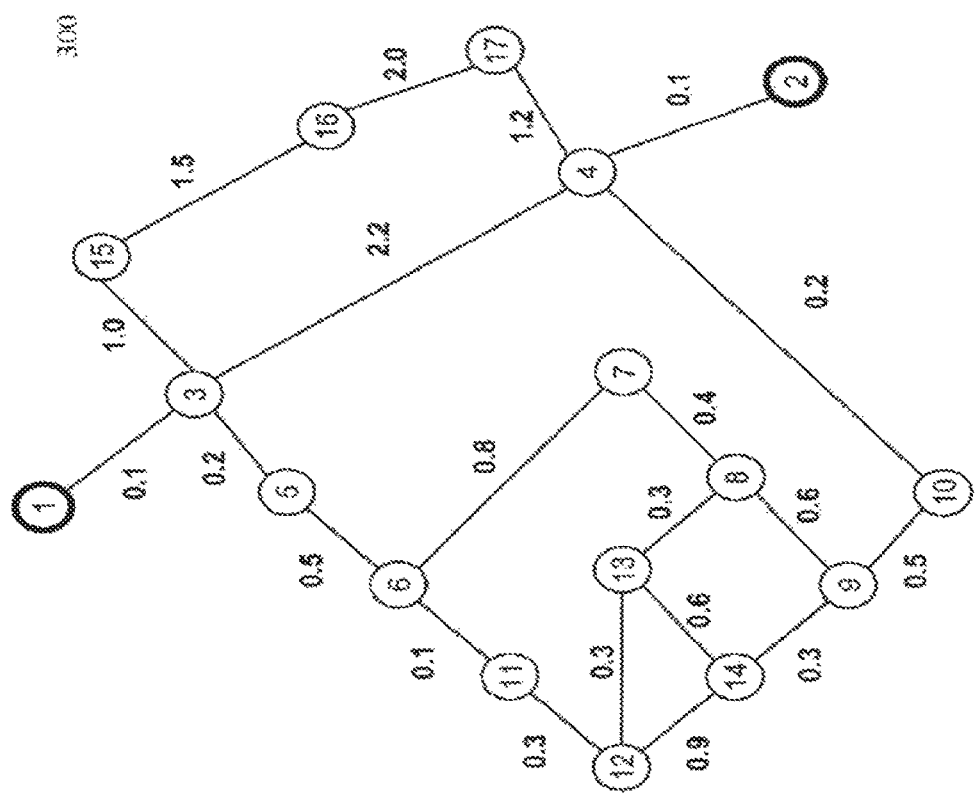
FIG. 3 illustrates an example of a road network according to an embodiment of the present application.

FIG. 3 shows an example of a road network according to an embodiment of the present application. The road network 300, which is also called a graph, has a plurality of nodes connected, via a plurality of links. Each line represents a shortest path and also represents both distance of both ingoing and outgoing directions between the connected nodes. Each node represents a specific location, like, e.g., a customer, that the drivers need to visit or serve. The term "customer" is not limited to a human being or an organization—a customer may be a generic point on a map which needs to be visited. As shown in FIG. 3, node 1 is connected to node 3. Node 2 is connected to node 4. Node 3 is connected to nodes 4, 5 and 15, and so on and so forth. The numerical value associated with each link, referring to as link weight, shows the cost between the two nodes at the two ends of the link. The cost may as an example, represent distance, fuel consumption, toll value, emission, or travel time. Although the nodes shown in FIG. 3 are labeled numerically, the labeling is for the convenience of processing. Any other suitable labeling methods may be used.

FIG. 3 shows in total 17 nodes, which may represent just a small set of customers. For practical applications, such number might be as high as 10,000 or more. A search algorithm based on such a large graph requires a huge amount of resources in term of computing speed, computing time, and memory storage. According to an embodiment of the present application, a large set of customer may be firstly clustered into a plurality of small subsets, represented by node groups, and then calculation of desired distance values may be divided into a plurality of sub searches, including a search inside a group (intra group search) and a search between groups (inter group search). As shown in FIG. 3, some nodes, such as nodes 14, 13, 8, and 9, are closely neighboring with each other and may be assigned to one group. These nodes may be deemed to be located in a metropolitan area. Some nodes, such as node 1 or node 2, do not connect with many other nodes. Each of them may be deemed to be in a single group, which represents an isolated customer.

Figure 4:
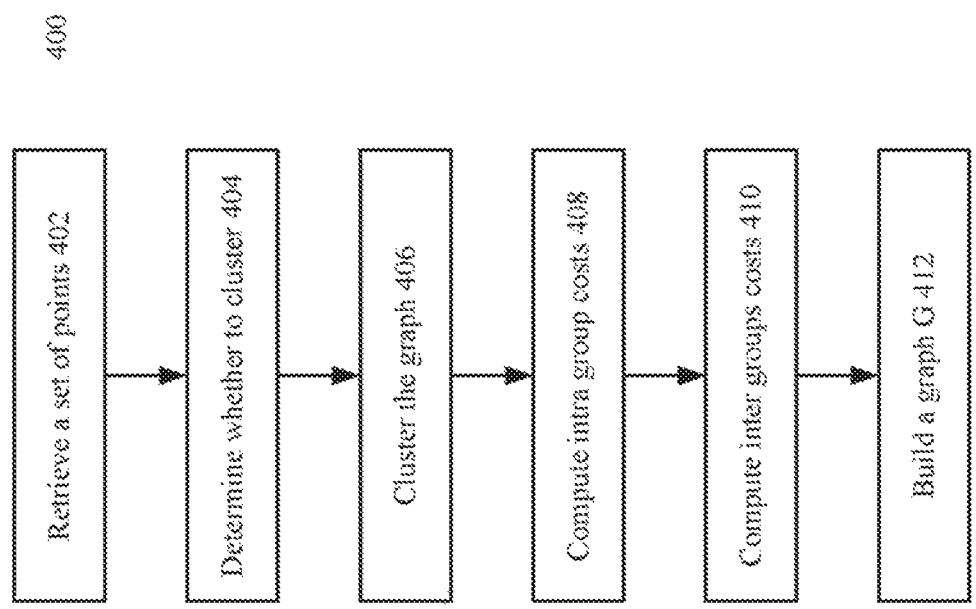
FIG. 4 illustrates a clustering method according to an embodiment of the present application.

FIG. 4 illustrates a clustering method implemented by the routing system according to an embodiment of the present application. This clustering method is preferably implemented as a pre-processing step before the routing system begins the actual routing computations, so that the actual response time is reduced. This clustering process may be implemented periodically such as every month or every season. This clustering process may be triggered by an event such as when a new set of GIS data is published, when a major road construction is finished, when a major road closure is announced, or when a major accident occurs. According to another embodiment, this clustering method is processed at the time when a routing request is received.

At step 402, the routing system 110 retrieves information of a plurality of points from the GIS database. The plurality of points may be all the nodes of a metropolitan map, a regional map, a national map, or a continental map. According to an embodiment, the information of a plurality of points represents a subset of available information stored in the GIS database. The retrieved information of these points is used to cluster them into subgroups may include only coordinates of nodes $v_1$ to $v_n$. Higher level of geographical information such as travel distance, highway hierarchy, and speed profiles are not included in the retrieved information of Step 402. According to an embodiment, the retrieved information may include only the coordinates of a set of points. Distance information can be calculated based on the coordinates. According to another embodiment, the retrieved information may include both the coordinate and distance data for the plurality of nodes. This reduced requirement on the amount of data in the retrieved information makes the processing more efficient and uses less computing resources. Other information, such as highway hierarchies, may be optionally used, but not required, for the clustering method to be implemented.

At step 404, the routing system 110 determines whether the graph needs to be clustered. If the number of customer locations is small, the routing system 110 determines that the nodes do not need to be clustered and ends the clustering method. According to an embodiment, the number of nodes in input is used as the basis for determining whether a graph needs to be clustered or not. According to an embodiment, if the number of nodes is greater than 100,000, or greater than 10,000, or greater than 1,000, or greater than 100, or greater than 50, then the graph needs to be clustered.

At step 406, the graph is clustered into a plurality of groups. This clustering step may be implemented according to various algorithms. According to an embodiment, the graph may be divided into a plurality of grids, each grid representing a node group. According to an embodiment, the division of the graph needs to satisfy at least two following two criteria:

1. The number of nodes in each group is no greater than a predetermined upper limit E, where E represents a positive integer; and 2. The cost, such as the Euclidean distance, between any two nodes in the same group is no greater than a predetermined upper limit M, where M represents a positive real number. This criterion limits the maximum cost such as distance in a group to be no greater than a desired value.

The selection between E and M represents a compromise between algorithm execution speed and accuracy. Higher values of E and lower values of M result in more accurate distance but more expensive to compute. Lower values of E and higher values of M results in less accurate distance but more efficient to computer.

The selection of E and M may be determined based on the computing capability of the routing server and the $3^{rd}$ party computing servers. Tests for selecting suitable values of E and M can be performed by taking a sample of data which the system is expected to receive, and then executing the algorithm with varying values of E and M. For every set of E and M values, both the computing time and the reached accuracy are recorded. According to an embodiment, the computing time and the reach accuracy obtained by the algorithms as set forth in the present application are compared with the ones obtained by querying the $3^{rd}$ Party Computing server 114. Based on the comparison results, a compromise can be chosen, depending on the extent that the users of the system are willing to wait, and which accuracy is required. For example, the following table summarizes the median computation time and accuracy, measured in terms of the difference between the estimated travel time obtained by the proposed algorithm and the travel time returned by the $3^{rd}$ Party Computing server 114, for a range of choices of E and M.

| E | M (meters) | Median error on times (minutes) | Total computational times (minutes) |
|---|---|---|---|
| 50 | 5000 | 0.13 | 87 |
| 50 | 10000 | 0.20 | 94 |
| 50 | 30000 | 0.21 | 103 |
| 200 | 5000 | 0.70 | 58 |
| 200 | 10000 | 1.08 | 41 |
| 200 | 30000 | 1.22 | 34 |

According to an embodiment, it is decided that an error around 1 minute is acceptable. Thus the corresponding values for E and M are E=200 and M=10000, which represents a desirable one to compute. E=200 and M=30000 are not selected because the committed error on times was too large.

A clustering procedure, such as a k-means method, is used to divide the set of points into k clusters. According to an embodiment, the initial number of groups is predetermined to be k=2. According to another embodiment, the initial number of groups is set to the total number of nodes divided by E. After a clustering process, for every cluster, both conditions discussed above are checked: that it contains no more than E number of nodes, and that the maximum Euclidean distance between any two points of the cluster is less than M. If either condition is violated by a cluster, that cluster is subsequently divided until both conditions are satisfied.

At step 408, a calculation for intra group cost is implemented, where the exact cost between all the pairs of nodes in a cluster is computed. According to an embodiment, the intra group cost represents the shortest path among all pairs in a same group. This computing processes is implemented by the $3^{rd}$ party computing server as shown in FIG. 1. Any suitable algorithm may be used in calculating the intra group shortest path, such as the Floyd-Warshall algorithm, or repeated Dijkstra processes.

At step 410, the inter group cost is computed. First, for every pair of clusters (A, B), the closest pair of points according to Euclidean distances (a, b) is searched and identified, where point "a" belongs to cluster A and point "b" belongs to cluster B. After all closest pairs for all groups are identified, these closest pairs are assigned to one group of nodes, referred to as "border node group." Then, the all pair minimum cost between all points in the border node group is computed. This computation is implemented by a $3^{rd}$ party computing server. According to an embodiment, this border node group represents an approximation of all border nodes. As the border node group is the outcome of finding the closest pairs between two groups, the closest pair may not include all natural or common sense border nodes between the two groups. Thus, the shortest paths between all pairs in the border node group may not be the exact shortest paths for all time, making the shortest path an approximation in a strict sense. Thus, generally speaking, the computed shortest-path represents an approximation, as not all the paths will be computed exactly. In one example, an exact, unapproximated shortest-path may exist between a pair of nodes that represents a direct link between them and does not include any other nodes in the set. If those two nodes are not directly linked in the graph produced by the present system, the path which the present system and algorithm produce will have to go though some of the other nodes, and thus be different from the real shortest-path. Then, in such a situation, the computation represents an approximation, rather than an exact shortest path.

At step 412, a graph G having added information is built. According to one embodiment, the Graph G includes all the original nodes. According to another embodiment, the Graph G includes only a subset of nodes selected from the original nodes. For example, the subset of nodes may include nodes representing the client locations or frequently-visited places. According to an embodiment, the graph G also includes arcs or labels between two nodes i and j if and only if an exact distance has been computed between those two nodes. Each arch between two nodes in G represents a shortest path. This graph G is small enough to be kept in memory.

Figure 5A:
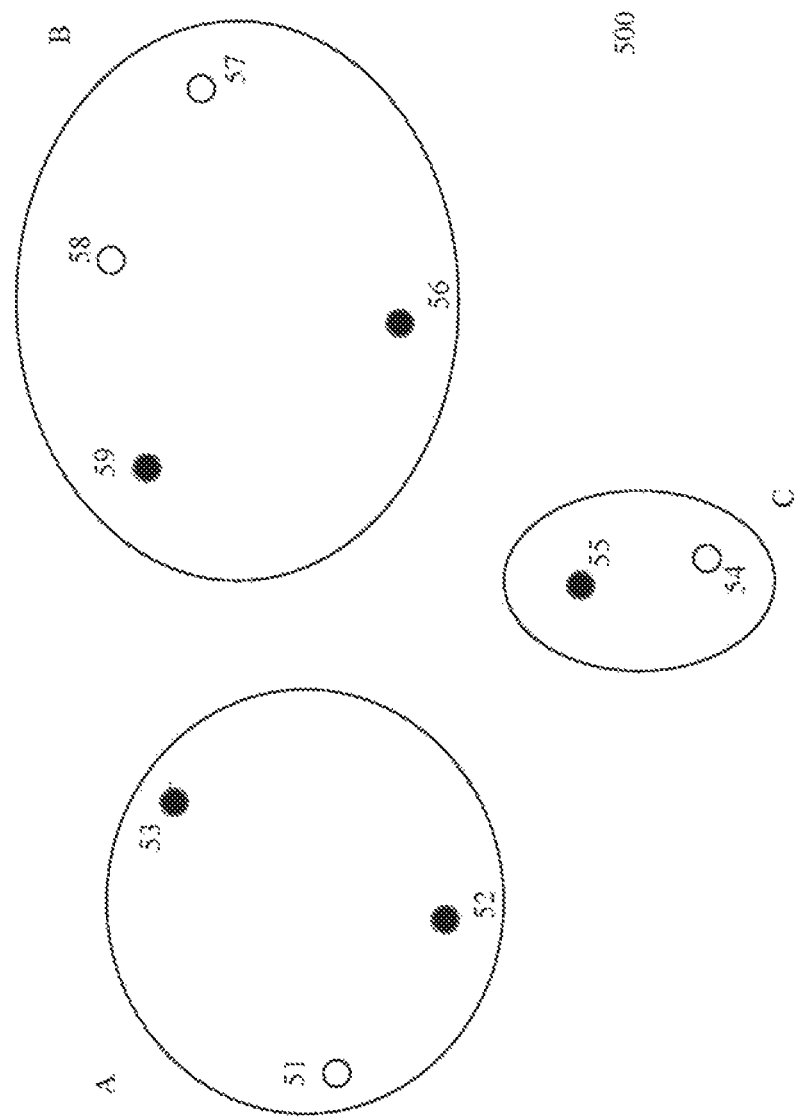
FIG. 5A illustrates a set of node groups according to an embodiment of the present application.

FIG. 5A illustrates three clusters resulting from the clustering process according to an embodiment of the present application. The graph 500 has nine nodes, which are clustered into three groups: group A, group B, and group C. Nodes 51, 52, and 53 belong to group A. Nodes 56, 57, 58, and 59 belong to group B. Nodes 55 and 54 belong to group C. The clustering method allows groups to have different sizes and different numbers of nodes as long as the maximum distance within one group and the maximum number of nodes within one group are below the upper limit M and E.

Among the nine nodes, five nodes 52, 53, 55, 56, and 59 are identified as the nodes that belong to the border node group. For example, nodes 52 and 55 represent the closest pair between group A and group C. Nodes 55 and 56 represent the closest pair between group C and group B. Nodes 59 and 53 represent the closest pair between group A and group B. In way of common sense, nodes 51, 54, 58, and 57 are at the outmost boundary of groups A, B, and C and would be routinely deemed as border nodes. But, according to the present application, nodes 51, 54, 57, and 58 do not belong to the border node group because they do not form a closest pair with any other nodes.

Figure 5B:
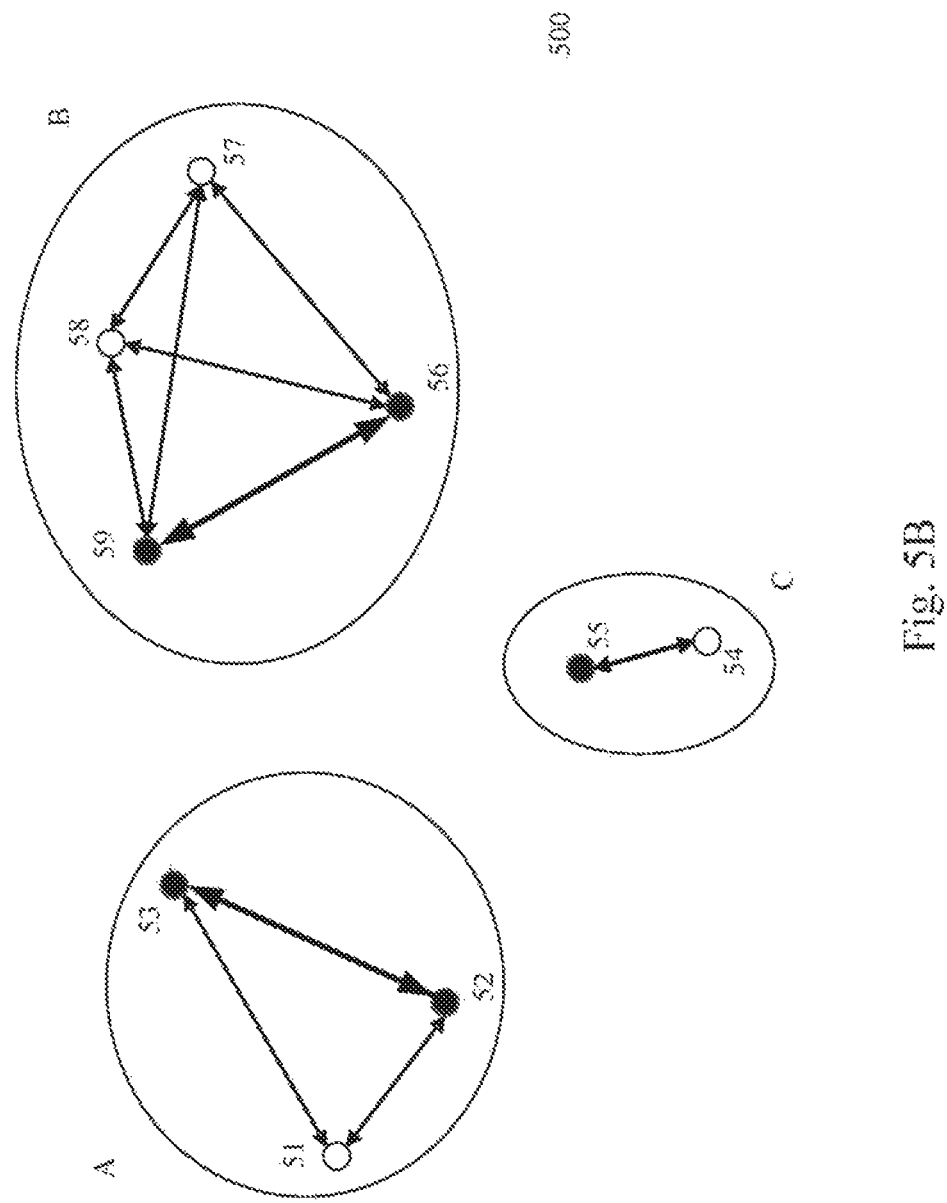
FIG. 5B illustrates intra group shortest paths according to an embodiment of the present application.

FIG. 5B illustrates intra group shortest paths of all pairs resulting from the clustering process according to an embodiment of the present application. As shown in FIG. 5B, intra group shortest paths are computed for groups A, B, and C, respectively. When the direction of the path does not make a difference, Group A has three shortest paths among three nodes. When the direction of the path needs to be identified with the distance, Group has six shortest paths due to the fact that each link has two directions. Similarly, Group B has six shortest paths among the four nodes, and Group C has one shortest path between two nodes when the direction does not make a difference.

FIG. 5C illustrates shortest paths of all pairs in the border node group resulting from the clustering process according to an embodiment of the present application. As shown in FIG. 5C, shortest path has been computed for all pairs of nodes in the border node group, which will be referred to as inter group shortest path in the present application. It is noted that the shortest path between nodes 52 and 53 is both intra group shortest path and also inter group shortest path.

Figure 5D:
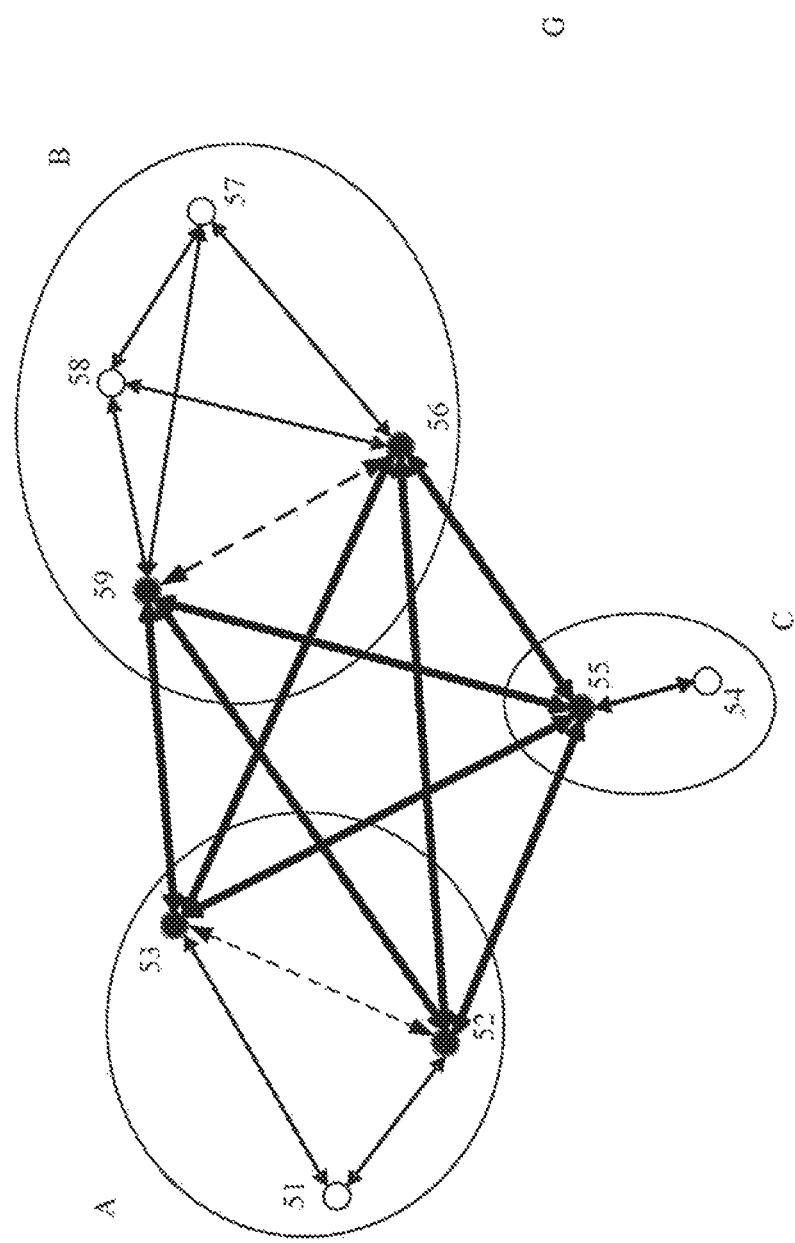
FIG. 5D illustrates an exemplary graph G according to an embodiment of the present application.

FIG. 5D illustrates an example of the graph G according to an embodiment of the present application. The graph G includes the clustering information, such as groups A, B, and C, the information of the border node group, the shortest intra group paths, and the inter group shortest paths. Thick arrows have been computed as distances between the inter cluster closest pairs among nodes in the border node group, which includes nodes 52, 53, 55, 56, and 59. Dash arrows represent arcs inside the same cluster but also connecting two nodes in the border node group. For example, the arc between node 53 and node 32 is inside group A. At the meantime, this arc also connects two nodes 53 and 52 that belong to the border node group. Thin arrows represent intra group shortest path. All arcs are bidirectional. Distances between any two points are computed as the shortest path inside such graph G. According to an embodiment, the information about clustering, the border node group, and shortest path among them is stored in a lookup table with flags and numerical values so that a subsequent process may refer to this lookup table for the information.

Figure 6:
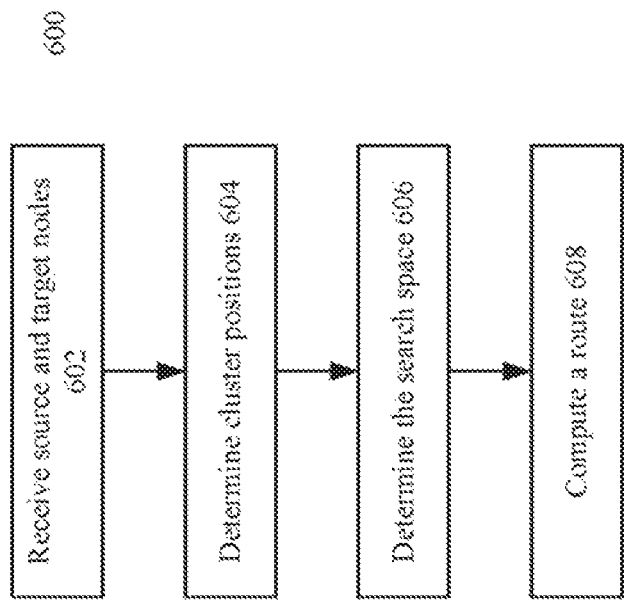
FIG. 6 illustrates a method of finding the shortest path between a starting node and a destination node according to an embodiment of the present application.

FIG. 6 illustrates a method of finding the shortest path according to an embodiment of the present application. At step 602, the routing system 110, while executing the routing algorithm, needs to know the distance between a given source node and another destination node. The starting location is represented as a node on graph G, while the destination location is represented by another node. At step 604, the routing system 110 retrieves the graph G from the lookup table and determines in which group the starting node and the destination node belong to. For example, if, using the graph shown in FIG. 5 as an example, the starting node and the destination node may be nodes 57 and 59, which means that they belong to the same group C, then the routing system 110 can simply use a pre-computed lookup table to identify a shortest path between the starting node and the ending node and no substantial amount of computing is required. But, if the starting node may be node 51 that belongs to group A, while the destination node may be node 57 that belong to group B, which means that the source node and the target node belong to different groups, then the routing system uses the Dijkstra algorithm over the graph G to determine the shortest path between nodes 51 and 57. Using Dijkstra on graph G is an extremely quick process, as the number of nodes in G may be equal to the number of customers, which is a very small number compared to a map graph comprising all the geographical features.

The phrase "an embodiment" as used herein does not necessarily refer to the same embodiment, though it may. In addition, the meaning of "a," "an," and "the" comprise plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method, comprising:
   determining, by a device, whether a quantity of nodes in a set of nodes satisfies a first threshold;
   clustering, by the device and based on determining that the quantity of nodes satisfies the first threshold, the set of nodes into a plurality of subgroups so that:

a quantity of nodes in each subgroup is no greater than a second threshold, and
a maximum distance between any two nodes of a same subgroup is no greater than a third threshold,
the second threshold and the third threshold being determined based on a computing capability of the device;
determining, by the device, intra group cost information for the plurality of subgroups,
the intra group cost information being associated with a shortest path among all pairs of nodes that belong to a same subgroup;
determining, by the device, inter group cost information,
the inter group cost information being associated with a shortest path between nodes of two subgroups; and
building, by the device and based on determining the intra group cost information and the inter group cost information, a graph of the set of nodes.

2. The method of claim 1, wherein the maximum distance represents a Euclidean distance.

3. The method of claim 2, wherein clustering the set of nodes comprises:
using coordinates of nodes to calculate the Euclidean distance.

4. The method of claim 1, wherein information of speed profile is not used for clustering the set of nodes.

5. The method of claim 1, further comprising:
identifying border nodes based on a closest Euclidean distance between nodes of two subgroups.

6. The method of claim 1, wherein the intra group cost information and the inter group cost information are calculated by another device.

7. The method of claim 1 further comprising:
creating a reduced graph that includes a predetermined number of nodes selected from the set of nodes.

8. The method of claim 7, wherein a Dijkstra algorithm is used on the reduced graph to find a path between any two nodes of the reduced graph.

9. The method of claim 1, wherein clustering the set of nodes comprises:
clustering the set of nodes periodically.

10. The method of claim 1, wherein clustering the set of nodes is triggered by a set of predetermined events.

11. A non-transitory computer-readable medium storing instructions, the instructions comprising:
one or more instructions that, when executed by at least one processor, cause the at least one processor to:
determine whether a quantity of nodes in a set of nodes satisfies a first threshold;
cluster, based on determining that the quantity of nodes satisfies the first threshold, the set of nodes into a plurality of subgroups so that:
a quantity of nodes in each subgroup is no greater than a second threshold, and
a maximum distance between any two nodes of a same subgroup is no greater than a third threshold,
the second threshold and the third threshold being determined based on a computing capability of the at least one processor;
determine intra group cost information for the plurality of subgroups,
the intra group cost information being associated with a shortest path among all pairs of nodes that belong to a same subgroup;
determine inter group cost information,
the inter group cost information being associated with a shortest path between nodes of two subgroups; and
build, based on determining the intra group cost information and the inter group cost information, a graph of the set of nodes.

12. The non-transitory computer-readable medium of claim 11, wherein the maximum distance represents a Euclidean distance.

13. The non-transitory computer-readable medium of claim 12, wherein the one or more instructions, that cause the at least one processor to cluster the set of nodes, cause the at least one processor to:
cluster the set of nodes using coordinates of nodes to calculate the Euclidean distance.

14. The non-transitory computer-readable medium of claim 11, wherein information of speed profile is not used for clustering the set of nodes.

15. The non-transitory computer-readable medium of claim 11, wherein the one or more instructions, when executed by the at least one processor, further cause the at least one processor to:
identify border nodes based on a closest Euclidean distance between two subgroups.

16. The non-transitory computer-readable medium of claim 11, wherein the one or more instructions, when executed by the at least one processor, further cause the at least one processor to:
create a reduced graph that includes a predetermined number of nodes selected from the set of nodes.

17. The non-transitory computer-readable medium of claim 11, wherein the one or more instructions, that cause the at least one processor to cluster the set of nodes, cause the at least one processor to:
cluster the set of nodes periodically.

18. A device comprising:
a memory; and
at least one processor communicatively coupled to the memory to:
determine whether a quantity of nodes in a set of nodes satisfies a first threshold;
cluster, based on determining that the quantity of nodes satisfies the first threshold, the set of nodes into a plurality of subgroups so that:
a quantity of nodes in each subgroup is no greater than a second threshold, and
a maximum distance between any two nodes of a same subgroup is no greater than a third threshold,
the second threshold and the third threshold being determined based on a computing capability of the device;
determine intra group cost information for the plurality of subgroups,
the intra group cost information being associated with a shortest path among all pairs of nodes that belong to a same subgroup;
determine inter group cost information,
the inter group cost information being associated with a shortest path between nodes of two subgroups; and
build, based on determining the intra group cost information and the inter group cost information, a graph of the set of nodes.

19. The device of claim 18, wherein the at least one processor, when building the graph of the set of nodes, is to:
build a graph including only a subset of the set of nodes.

20. The device of claim 18, where at least one of the second threshold or the third threshold is determined based on a computing capability of another device.

\* \* \* \* \*